(12) United States Patent
Wang

(10) Patent No.: US 12,153,793 B2
(45) Date of Patent: Nov. 26, 2024

(54) MULTIPLE INPUT DEVICE SUPPORT

(71) Applicant: DELL PRODUCTS L.P., Round Rock, TX (US)

(72) Inventor: Kai Wang, Shanghai (CN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/181,792

(22) Filed: Mar. 10, 2023

(65) Prior Publication Data

US 2024/0264739 A1 Aug. 8, 2024

(30) Foreign Application Priority Data

Feb. 2, 2023 (CN) .......................... 202310120037.7

(51) Int. Cl.
*G06F 3/04886* (2022.01)
*G06F 3/0354* (2013.01)
*G06F 9/54* (2006.01)

(52) U.S. Cl.
CPC ...... *G06F 3/04886* (2013.01); *G06F 3/03547* (2013.01); *G06F 9/543* (2013.01); *G06F 2203/04808* (2013.01)

(58) Field of Classification Search
CPC ......... G06F 3/033; G06F 3/038; G06F 3/0487
See application file for complete search history.

(56) References Cited

U.S. PATENT DOCUMENTS

| 5,805,144 | A | 9/1998 | Scholder et al. |
| 6,507,338 | B1 | 1/2003 | Liao et al. |
| 6,623,194 | B1* | 9/2003 | Lip ...................... G06F 3/0213 345/157 |
| 2005/0179655 | A1* | 8/2005 | Ludwig .................. G06F 3/038 345/157 |
| 2010/0245395 | A1 | 9/2010 | LeBert et al. |
| 2020/0233501 | A1* | 7/2020 | Jacobs ................ G06F 3/04845 |

* cited by examiner

*Primary Examiner* — Nelson M Rosario
(74) *Attorney, Agent, or Firm* — Larson Newman, LLP

(57) ABSTRACT

An information handling system enables a first human interface device and a second human interface device for simultaneous use with an application in the information handling system, wherein the application includes a first region and a second region. The system associates the first human interface device with the first region and associates the second human interface device with the second region, and associates the first human interface device with a first pointer and associates the second human interface device with a second pointer. The system also controls a first movement of the first pointer within the first region via the first human interface device while simultaneously controlling a second movement of the second pointer within the second region via the second human interface device.

20 Claims, 7 Drawing Sheets

Multiple Input Settings

Enable multiple input devices

Select two input devices from below:

Associate a pointer to an input device:

Select the first input device as a primary input device

Set the touchpad gesture

MULTIPLE INPUT DEVICE SUPPORT

FIELD OF THE DISCLOSURE

The present disclosure generally relates to information handling systems, and more particularly relates to multiple input device support.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system enables a first human interface device and a second human interface device for simultaneous use with an application in the information handling system, wherein the application includes a first region and a second region. The system associates the first human interface device with the first region and associates the second human interface device with the second region, and associates the first human interface device with a first pointer and associates the second human interface device with a second pointer. The system also controls a first movement of the first pointer within the first region via the first human interface device while simultaneously controlling a second movement of the second pointer within the second region via the second human interface device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
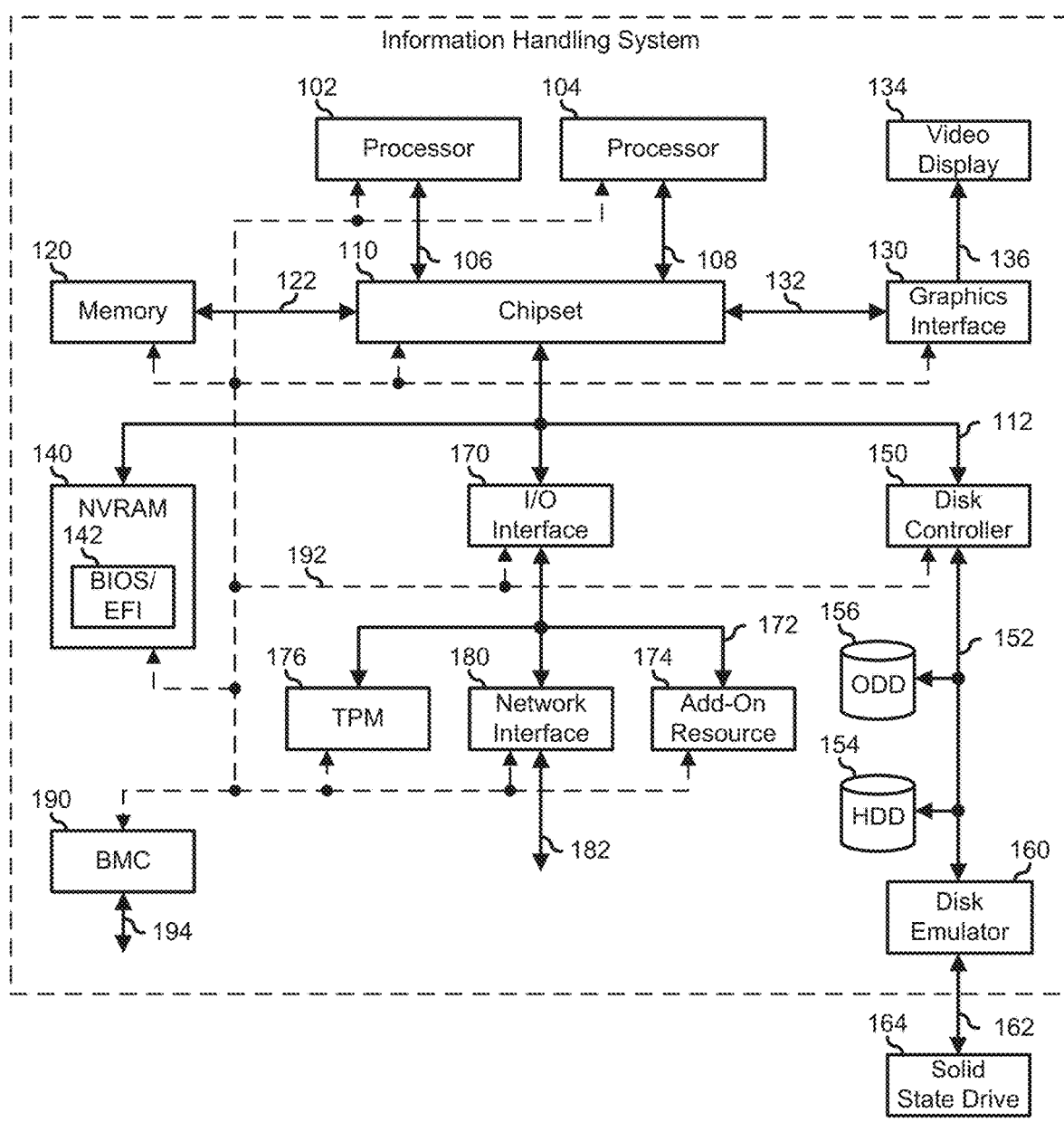
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as dynamic random access memory (DRAM) DIMMs, static random access memory (SRAM) DIMMs, non-volatile DIMMs (NV-DIMMs), storage class memory devices, read-only memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Portable information handling systems, which are often referred to as laptops, notebooks, all-in-one computers, etc. typically include a touchpad as an input device in addition to a keyboard. Other input devices such as a mouse, trackball, joystick, etc. may also be added as preferred by a user. However, typically the user utilizes one input device at a time. As such, the user may have to move a cursor between various sections of an application interface to create or manage content such as to play a game. For example when creating a PowerPoint® slide, the user may use the mouse to move the cursor to select an icon and move the cursor to a slide pane to paste the icon. If the user wants to update a property of the icon, such as to change its color, then the user may use the mouse to move the cursor to select a color and then move the cursor back to the slide pane. Although users are used to these typical movements, these movements are inefficient. Accordingly if the user can utilize more than one input device simultaneously, then the user may become more efficient in performing various tasks. As such, the present disclosure allows multiple input devices to be utilized simultaneously by the user.

Figure 2:
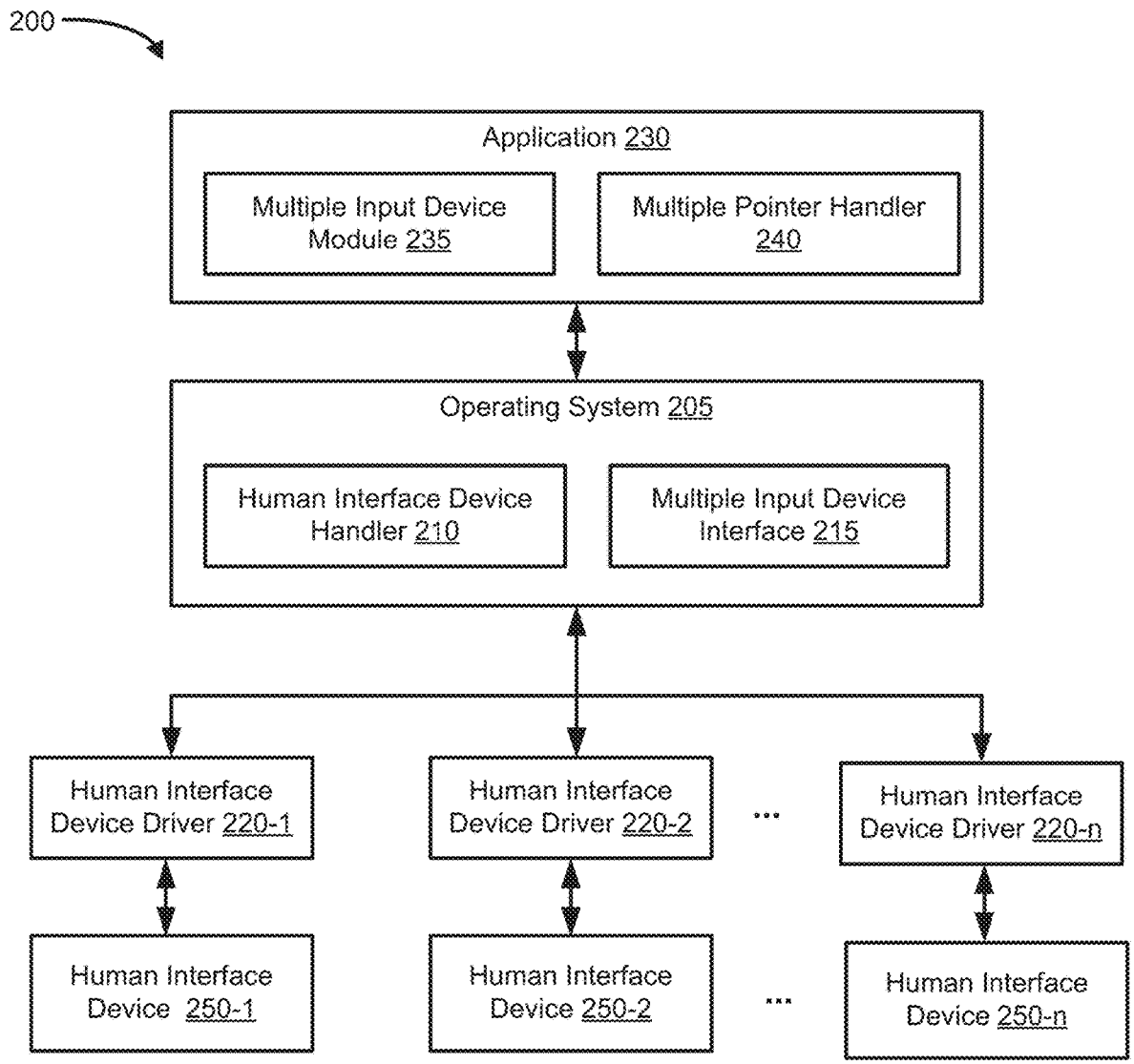
FIG. 2 is a block diagram illustrating a system for multiple device support, according to an embodiment of the present disclosure.

FIG. 2 shows a block diagram of a system 200 for supporting the simultaneous use of multiple human interface devices in an information handling system similar to information handling system 100 of FIG. 1. System 200 includes an operating system 205, an application 230, human interface devices 250-1 through 250-n, and human interface device drivers 220-1 through 220-n. Human interface devices 250 are communicatively coupled to drivers 220 which are communicatively coupled to operating system 205. Operating system 205 is further communicatively coupled to application 230.

Human interface devices 250-1 through 250-n (collectively referred to as human interface devices 250) 50) such as, a keypad or keyboard, a mouse, stylus, joystick, pen, and touchscreen are devices that interact with humans, generally taking input and some cases delivering output. Typically, human interface devices are used by humans to control the movement of a pointer also referred to as a cursor in a display device. In particular, human interface devices 250 may be pointing devices that allow the user to input spatial data. As such, the human interface device also referred to herein as an input device, may support an indicator, such as a cursor also referred to as a pointer on the display device. Movements of the pointing device are typically reflected on the display device by movements of the associated indicator.

Human interface device drivers 220-1 through 220-n (also collectively referred to as human interface device drivers 220 or simply drivers 220) allow human interface devices 250 to communicate with operating system 205 through a report or message during an event. As such, human interface devices 250 and operating system 205 may exchange data via reports, such as an input, output, and/or feature reports via drivers 220.

Figure 8:
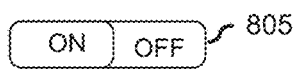
FIG. 8 is a diagram of a graphical user interface for multiple input device support, according to an embodiment of the present disclosure.
Figure 8:
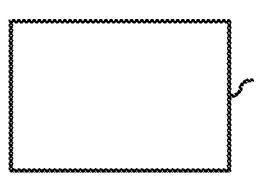
Figure 8:
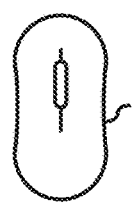
Figure 8:
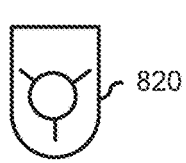
Figure 8:
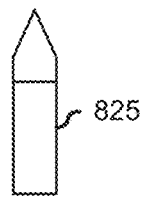
Figure 8:
Figure 8:
Figure 8:
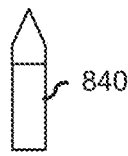
Figure 8:
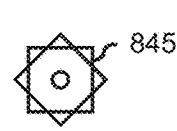
Figure 8:
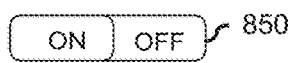
Figure 8:
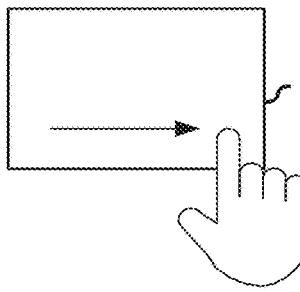
Figure 8:
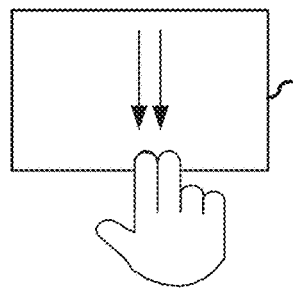
Figure 8:
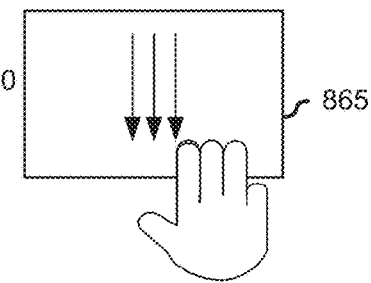

Operating system 205 includes a human interface device handler 210 and a multiple input device interface 215 that lets a user enable and/or configure support for the simultaneous use of multiple human interface devices in an information handling system, such as depicted in FIG. 8. On the other hand, human interface device handler 210 allows the user to utilize multiple human interface devices 250 with application 230 via multiple input device module 235. Application 230 may be a local-based or cloud-based application executing across a network such as the internet or a corporate area network. Application 230 may include various applications that accept inputs from human interface devices, such as word processing, gaming, collaboration, designer, creator, producer applications, or similar.

Multiple input device module 235 may be used to allow the user to use human interface devices 250 for application 230, wherein each human interface device is associated with a pointer. Multiple pointer handler 240 may be configured to allow the user to utilize multiple pointers in application 230. Each human interface device may also be associated with a particular region of the application interface. Accordingly, the human interface device associated with a region may be able to move a pointer within that region, which would avoid conflict between the pointers.

In one example, the user may choose two human interface devices to use simultaneously. Both a first human interface device and a second human interface device can work as two individual and/or independent inputs on the system, wherein each human interface device controls a different region of the application that is displayed on the display monitor. One of the human interface devices may be used as a primary input device while a second human interface device may be used as a secondary input device, which may be used to assist the primary input device. For example, the first human interface device, such as a mouse may be set as the primary input device while the second input device, such as a touchpad or a pointing stick may be set as the secondary input. The primary input may be associated with an edit region of an application interface while the secondary input may be associated with a tool region of the application interface. Here, the first human interface device may be associated with an edit region of an application while the second human interface device may be associated with a tool region.

In one example, assuming that the first human interface device is a mouse, hand movements on the mouse may allow control of a first pointer movement in the edit region. Accordingly, assuming that the second human interface device is a touchpad, finger movements of the other hand on the touchpad may allow control of a second pointer movement in the tool region simultaneously. For example, a one-finger swipe left, right, up, or down on the touchpad may change the attributes of a tool in the tool region. In this example, the one-finger swipe can change the details of a brush such as the color or width function of a brush tool in a graphics software application while the other hand can be used to apply the brush function in the edit region of the application interface. In another example, the first human interface device may select a text, word, or object from the first region of a word processing software application, and the second human interface device may be used to select a position or location in the second region and paste the selected text, word, or object to the selected position in the second region. Thus, using both hands improve the efficiency in working with the application.

In another embodiment, instead of associating a particular region to a human interface device, the human interface device may be associated with a window where multiple windows are used by the application, such as in the split window function of Microsoft Word®. In yet another embodiment, a human interface device may be associated with one screen while another human interface device may be associated with another screen when the display monitor is using a split screen feature.

Those of ordinary skill in the art will appreciate that the configuration, hardware, and/or software components of system 200 depicted in FIG. 2 may vary. For example, the illustrative components within system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for the continuity of the description. Each of these components can be implemented with hardware and/or software, including virtual machines. Further, the components shown are not drawn to scale and system 200 may include additional or fewer components. In addition, connections between components may be omitted for descriptive clarity.

Furthermore, some components that are represented as separate components in FIG. 2 may in certain embodiments instead are integrated with other components. For example, in certain embodiments, all or a portion of the functionality provided by the illustrated components may instead be provided by components integrated into one or more processor(s) as a system-on-a-chip. Also, the components of system 200 may be implemented in hardware, software, firmware, or any combination thereof.

Figure 3:
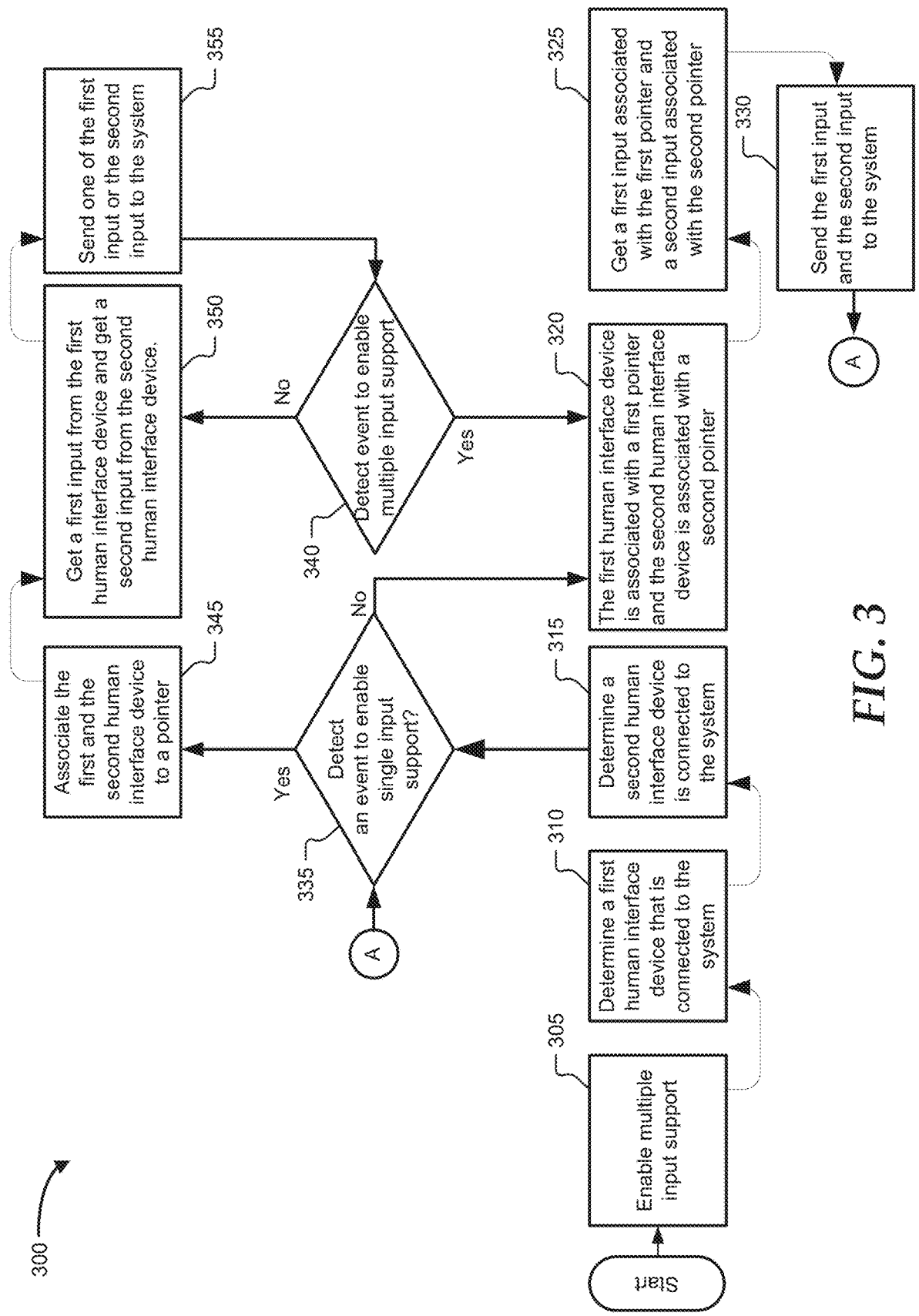
FIG. 3 is a flowchart illustrating a method for multiple device support, according to an embodiment of the present disclosure.

FIG. 3 shows a flowchart of a method 300 for enabling simultaneous usage of multiple human interface devices in an information handling system. Method 300 may be performed by one or more components of system 200 of FIG. 2. However, while embodiments of the present disclosure are described in terms of system 200 of FIG. 2, it should be recognized that other systems may be utilized to perform the described method.

Method 300 typically starts at block 305, where support for inputs from multiple human interface devices is enabled. The multiple input support may be enabled by setting a flag to true, which can be enabled by default at the factory or via a user interface. At block 310, the method determines a first human interface device that is connected to the information handling system. At block 315, the method may determine a second human interface device is also connected to the information handling system.

At block 320, the method may associate the first human interface device with a first pointer and the second human interface device with a second pointer. In one example, a mouse may be associated with the first pointer, while a touchpad may be associated with the second pointer. At block 325, the method may get a first input from the first human interface device and a second input from the second human interface device. The first input may include information such as a first position and a first click event associated with a movement of the first pointer and/or the first human interface device. The second input may include information such as a second position and a second click event associated with a movement of the second pointer and/or the second human interface device. At block 330, the method may send the information associated with the first input and the second input to the operating system and/or application. The method may update the location of the pointers on the display device based on the first input and the second input. The method application may also perform actions based on the click events associated with the first input and the second input.

At decision block 335, the method may detect an event to enable single input support. In one embodiment, the user may press a hotkey button to enable the single input support. For example, the user may turn the touchpad to mouse mode. If the method detects the event, then the "YES" branch is taken, and the method proceeds to block 345. If the method does not detect the event, then the "NO" branch is taken, and the method proceeds to block 320.

At block 345, the method may associate the first human interface device and the second human interface device to a pointer. If there is a peripheral human interface device, such as a mouse or a trackball, in addition to the touchpad, then these human interface devices may be associated with one pointer. At block 350, the method may get the first input from the first human interface device. The method may also get a second input from the second human interface device, wherein the input is associated with the pointer. For example, if the click event is associated with a movement of the first human interface device, then the method may get the first input. If the click event is associated with a movement of the second human interface device, then the method may get the second input.

The first input and the second input may include information about the position and click event associated with the movement of the pointer. For example, the method may get the position and click event from the mouse or trackball and the position and click event from the touchpad. At block 355, the method may send one of the first input or the second input to the operating system that was retrieved at block 350. The method may send the input with the latest information to the operating system and/or application and update the location of the pointer on the display device based on the input. The method application may also perform an action based on the click event associated with the input.

At decision block 340, the method may detect an event to enable multiple input support. For example, the user may press a hotkey to enable support for multiple inputs. The user may also turn the touchpad to dual cursor mode. If the method detects the event, then the "YES" branch is taken, and the method proceeds to block 320. If the method does not detect the event, then the "NO" branch is taken, and the method proceeds to block 350.

Figure 4:
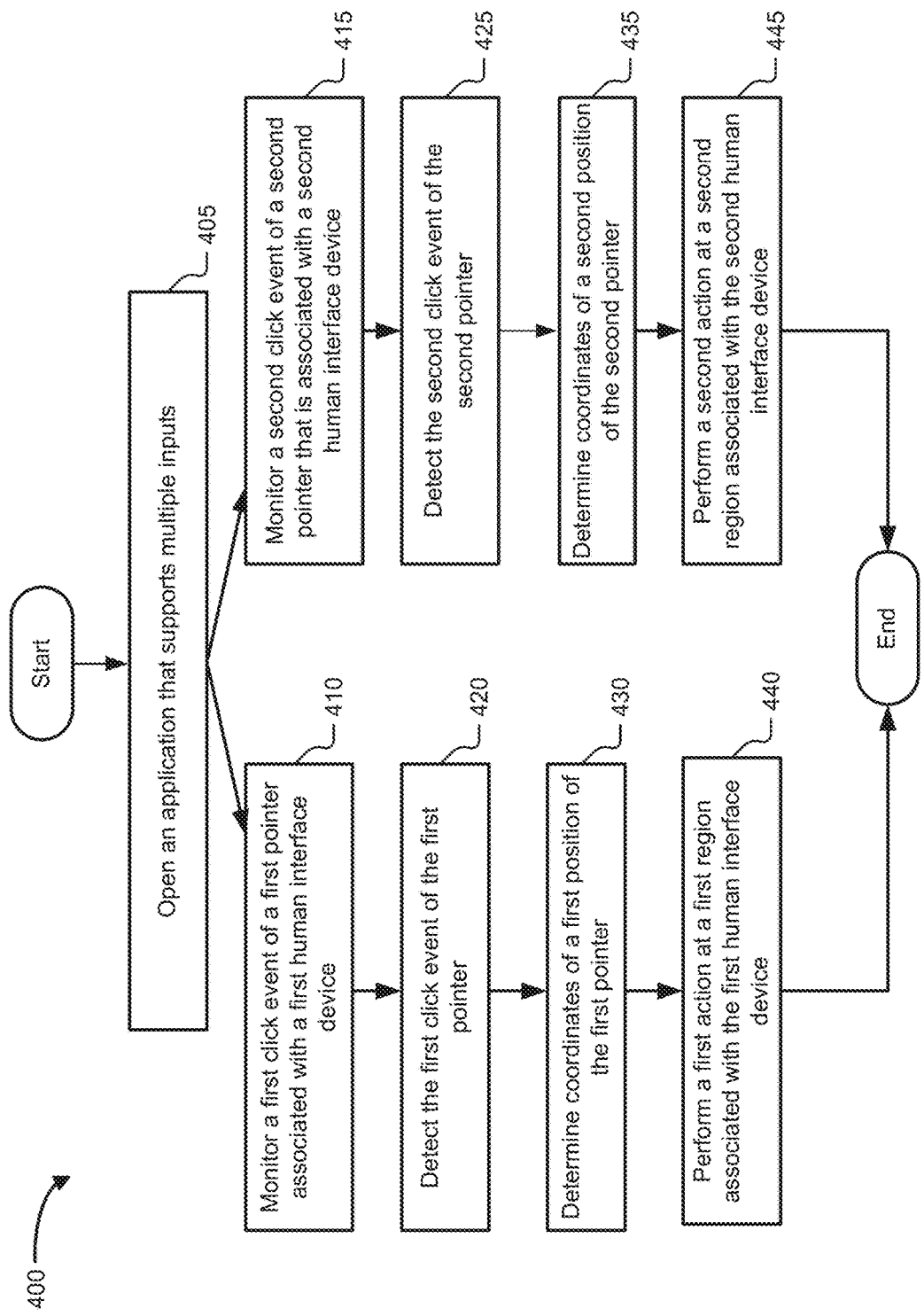
FIG. 4 is a flowchart illustrating of a method for multiple device support, according to an embodiment of the present disclosure.

FIG. 4 shows a flowchart of a method 400 for simultaneously using multiple human interface devices with an application. Method 400 typically starts at block 405 where an application that supports multiple inputs is opened, wherein each input is associated with a different human interface device. At block 410, the method may monitor for a first-click event that is associated with a first pointer. The first pointer is associated with a first human interface device. At block 420, the method may detect the first click event associated with the first pointer. At block 430, the method may determine the coordinates of a first position of the first pointer. At block 440, the method may perform a first action at a first region associated with the first human interface device. For example, the first action may be selecting a text widget from a ribbon.

At block 415, the method may monitor for a second click event that is associated with a second pointer. The second pointer is associated with a second human interface device. At block 425, the method may detect the second click event associated with the second pointer. At block 435, the method may determine the coordinates of a second position of the second pointer. At block 445, the method may perform a second action at a second region associated with the second human interface device. For example, the second action may be pasting the text widget to an edit region.

Figure 5:
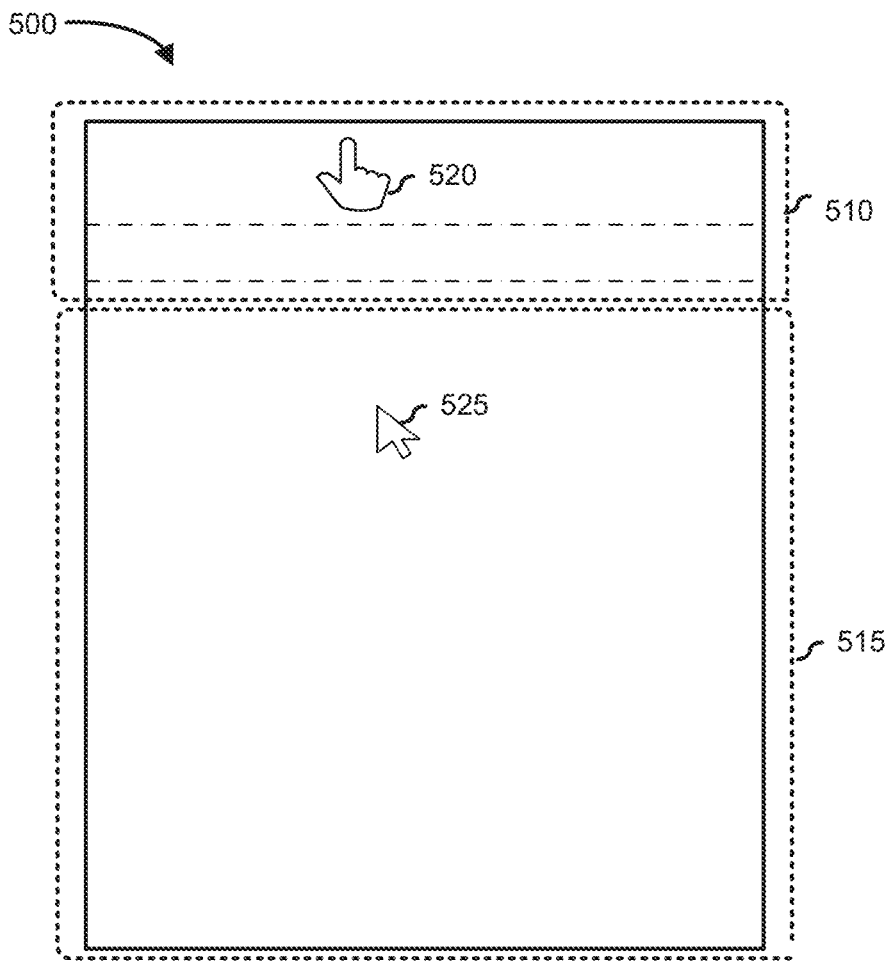
FIG. 5 is a diagram of an application interface configured for multiple input device support, according to an embodiment of the present disclosure.

FIG. 5 shows a diagram of an application interface 500 of an application with multiple input support. Application interface 500 includes regions 510 and 515. Application interface 500 also includes pointers 520 and 525. Pointer 520 may be associated with the first human interface device which is further associated with region 510. As such, the first human interface device may control the movement of pointer 520 within region 510. Pointer 525 may be associated with a second human interface device which is further associated with region 515. As such, the second human interface device may control the movement of pointer 525 within region 515. This avoids pointer collisions. In one embodiment, region 510 may include a toolbar and/or a menu bar while region 515 may include a work, edit, or view area. In one embodiment, the first human interface device may be a touchpad, a touch screen, or similar while the second interface device may be a mouse, a stylus, a trackball, or similar.

Although it is shown that application interface 500 includes two regions, application interface 500 may be divided into more than two regions and one or both of the human interface devices may be associated with two or more regions. For example, when application interface 500 includes three regions, one human interface device may be associated with two regions and the second human interface device may be associated with the third region. Similarly, when application interface 500 includes four regions, then the first human interface device may be associated with two regions and the second human interface device may be associated with the other two regions.

Figure 6:
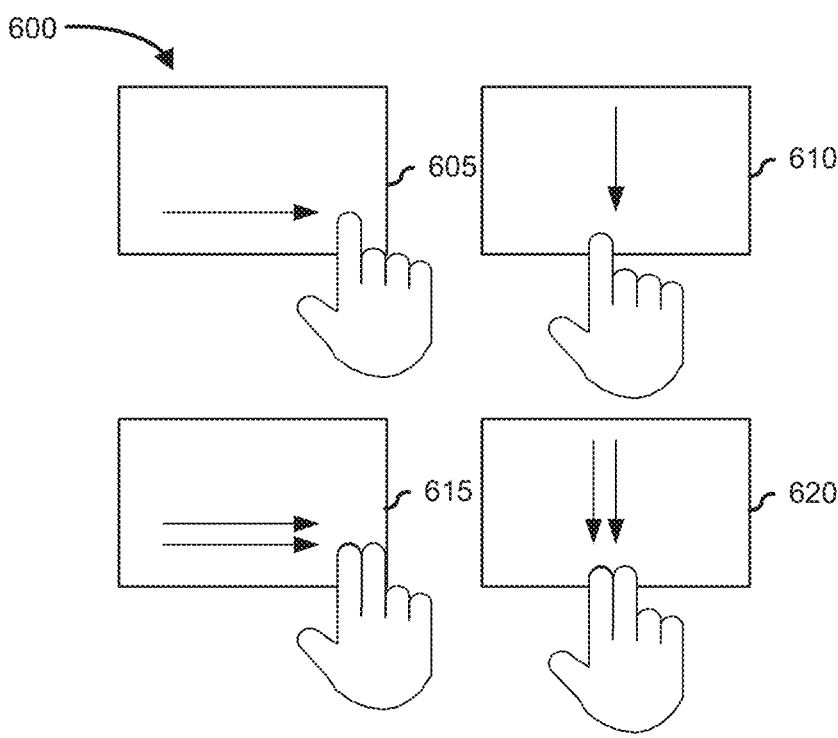
FIG. 6 is a diagram of a set of touchpad gestures, according to an embodiment of the present disclosure.

FIG. 6 shows a diagram of a set 600 of gestures that may be selected by the user or associated by default to the usage of a human interface device, such as a touchpad or touch screen upon its selection as an input device. The set of gestures includes gestures 605, 610, 615, and 620. In one example, gesture 605 may be dragging a single finger across a touchpad while gesture 605 may be dragging a single finger down the touchpad. The gestures may also include dragging two fingers across the touchpad such as gesture 615 or dragging two fingers down the touchpad like in gesture 620. The gesture may be associated with a function. For example, swiping with a single finger may be used to switch between functions in a tool region. The touchpad gestures may also include one or more tap actions in addition to the swiping action. For example, one tap may be used to select a function in the tool region.

Figure 7:
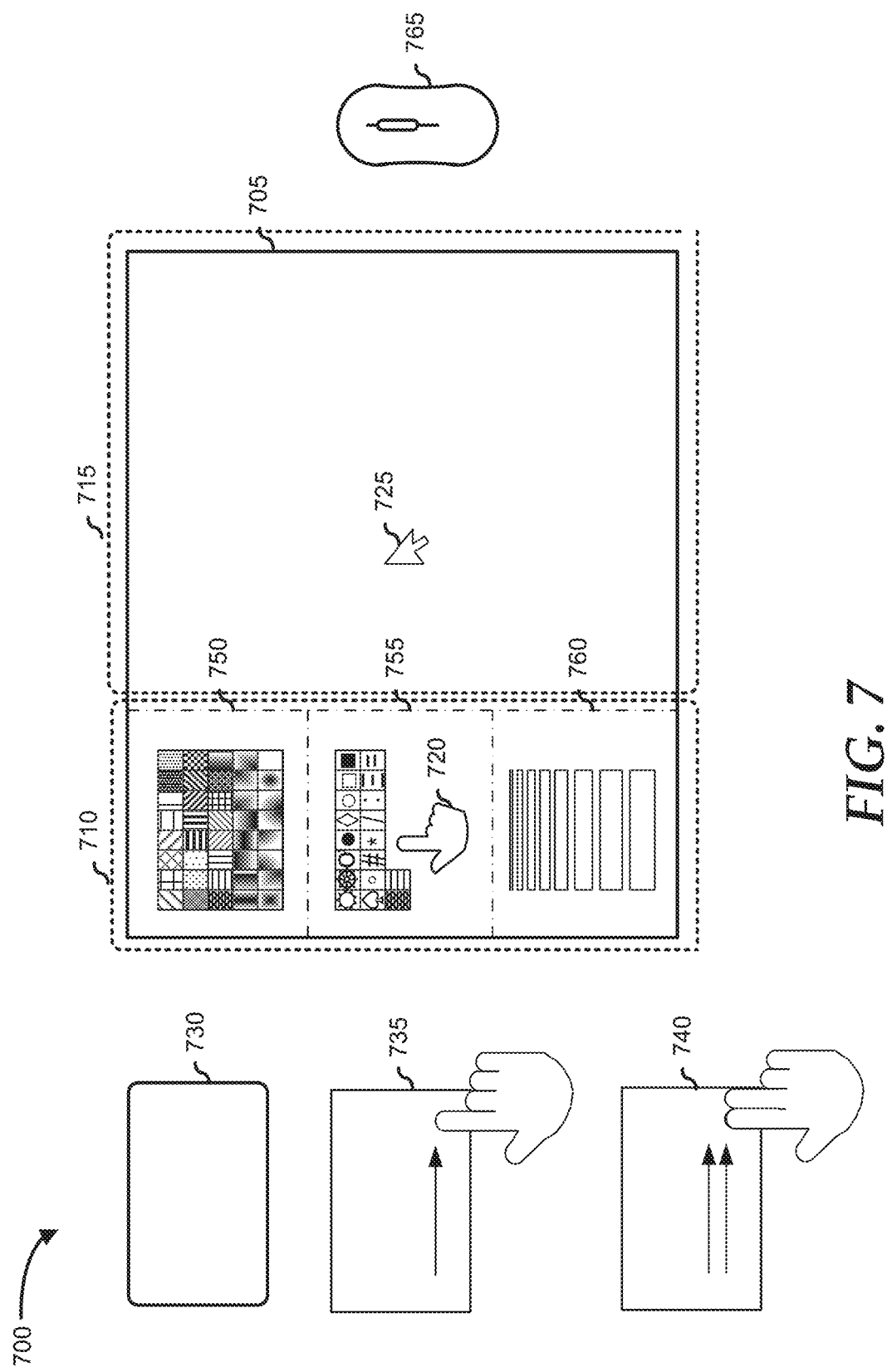
FIG. 7 is a diagram of an application interface configured for multiple input device support, according to an embodiment of the present disclosure.

FIG. 7 shows a diagram 700 for the usage of multiple human interface devices in an application interface. In this example, diagram 700 includes an application interface 705 that further includes regions 710 and 715. Application interface 705 may be configured to use multiple human interface devices, wherein each region may be associated with a human interface device. The human interface device associated with each region may be distinct and both devices may be used simultaneously.

In one embodiment, region 710 may be a tool region that is associated with a first human interface device 730, such as a touchpad or touch screen of the information handling system. A pointer 720 may be associated with a human interface device and can be moved within region 710 which may be a tool region. The tool region is an area in the application interface wherein the tools and/or functions of the application may be accessed, used, or selected via a gesture. For example, a single touchpad gesture using a left hand, such as illustrated in gesture 735, via a swipe left/right/up or down may be used to select or update a feature in function sets 750, 755, or 760. Pointer 720 may also be used to select or unselect items, such as text, images, objects, etc. While two touchpad gestures, such as illustrated in touchpad gesture 740 may be used to switch between function sets 750, 755, or 760.

Region 715 may be an edit region that is associated with a second human interface device 765, such as a mouse, stylus, or trackball. For example, using a right hand with second human interface device 765 may be used to move a pointer 725 within region 715, wherein pointer 725 may be used to paste a selected object in region 715.

In this example, second human interface device 765 is associated with region 715 and pointer 725 while first human interface device 730 is associated with region 710 and pointer 720. However, the reverse may also work, wherein second human interface device 765 is associated with region 710 while first human interface device 730 is associated with region 715.

FIG. 8 shows a diagram of a graphical menu interface 800 for enabling multiple input devices of an information handling system. Graphical menu interface 800 includes toggle buttons 805 and 850 and a set of human interface devices, such as a touchpad 810, a mouse 815, a trackball 820, and a stylus pen 825. Toggle button 805 may be used to enable or disable multiple input devices. While toggle button 850 may be used to enable the first human interface device as a primary input device. Graphical menu interface 800 includes a set of pointers, such as pointers 830, 835, 840, and 845. Graphical menu interface 800 includes a set of gestures, such as gestures 855, 860, and 865. A user may define or enable one or more of the gestures when touchpad 810 is one of the selected human interface input devices. If touchpad 810 was chosen as one of the input devices, then the user may be able to select one or all of gestures 855, 860, and 865.

Throughout this disclosure, a hyphenated form of a reference numeral refers to a specific instance of an element and the un-hyphenated form of the reference numeral refers to the element generically. Thus, for example, "human interface device "250-1" refers to an instance of a human interface device class, which may be referred to collectively as "human interface devices 250" and any one of which may be referred to generically as "a human interface device 250". Similarly, human interface device drivers "220-1" refers to an instance of a human interface device driver class, which may be referred to collectively as "human interface devices 220" and any one of which may be referred to generically as "a human interface device driver 220".

Although FIG. 3, and FIG. 4 show example blocks of method 300 and method 400 in some implementations, method 300 and method 400 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 300 and method 400 may be performed in parallel. For example, blocks 310 and 315 of method 300 may be performed in parallel. In addition, one of skill in the art will appreciate that the above flowcharts explain typical examples, which can be extended to advanced applications or services in practice.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
    enabling, by a processor, a first human interface device and a second human interface device for simultaneous use within an application interface at an information handling system, wherein the application interface includes a first region and a second region, and wherein the first human interface device is a mouse, and the second human interface device is a touchpad;
    associating the first human interface device with the first region and associating the second human interface device with the second region, wherein the first region is a tool region and the second region is an edit region;
    associating the first human interface device with a first gesture and associating the second human interface device with a second gesture;
    associating the first human interface device with a first pointer and associating the second human interface device with a second pointer; and
    controlling a first movement of the first pointer within the tool region via the first gesture using the mouse while simultaneously controlling a second movement of the second pointer within the edit region via the second gesture using the device touchpad.

2. The method of claim 1, wherein the first human interface device is set as a primary input.

3. The method of claim 1, wherein the second human interface device is set as a secondary input.

4. The method of claim 1, wherein the first pointer is used to select an object and the second pointer is used to paste the object.

5. The method of claim 1, further comprising getting a first position and a first click event associated with the first movement of the first human interface device.

6. The method of claim 5, further comprising getting a second position and a second click event associated with the second movement of the second human interface device.

7. The method of claim 6, further comprising transmitting the first position, the first click event, the second position, and the second click event to the application.

8. An information handling system, comprising:
    a processor; and
    a memory storing instructions that when executed cause the processor to perform operations including:
        enabling a first human interface device and a second human interface device for simultaneous use with an application interface in the information handling system, wherein the application interface includes a first region and a second region, and wherein the first human interface device is a trackball. and the second human interface device is a touchpad;
        associating the first human interface device with the first region and associating the second human interface device with the second region, wherein the first region is a tool region and the second region is an edit region;
        associating the first human interface device with a first gesture and associating the second human interface device with a second gesture;
        associating the first human interface device with a first pointer and associating the second human interface device with a second pointer; and
        controlling a first movement of the first pointer within the -tool region via the first gesture using the trackball while simultaneously controlling a second movement of the second pointer within the second edit region via the second gesture using the touchpad.

9. The information handling system of claim 8, wherein the first human interface device is set as a primary input.

10. The information handling system of claim 8, wherein the second human interface device is set as a secondary input.

11. The information handling system of claim 8, wherein the first pointer is used to select an object and the second pointer is used to paste the object.

12. The information handling system of claim 8, further comprising getting a first position and a first click event associated with the first movement of the first human interface device.

13. The information handling system of claim 12, further comprising getting a second position and a second click event associated with the second movement of the second human interface device.

14. The information handling system of claim 13, further comprising transmitting the first position, the first click event, the second position, and the second click event to the application.

15. A non-transitory computer-readable medium to store instructions that are executable to perform operations comprising:
    enabling a first human interface device and a second human interface device for simultaneous use with an application interface at an information handling system, wherein the application interface includes a first region and a second region, and wherein the first human interface device is a mouse, and the second human interface device is a touchpad;
    associating the first human interface device with the first region and associating the second human interface device with the second region, wherein the first region is a tool region and the second region is an edit region;

associating the first human interface device with a first gesture and associating the second human interface device with a second gesture;

associating the first human interface device with a first pointer and associating the second human interface device with a second pointer; and controlling a first movement of the first pointer within the tool region via the first gesture using the mouse while simultaneously controlling a second movement of the second pointer within the edit region via the second gesture using the touchpad.

16. The non-transitory computer-readable medium of claim 15, wherein the first human interface device is set as a primary input.

17. The non-transitory computer-readable medium of claim 15, wherein the second human interface device is set as a secondary input.

18. The non-transitory computer-readable medium of claim 15, wherein the first pointer is used to select an object and the second pointer is used to select a location to paste the object.

19. The non-transitory computer-readable medium of claim 18, further comprising getting a first position and a first click event associated with the first movement of the first human interface device.

20. The non-transitory computer-readable medium of claim 19, further comprising transmitting the first position and the first click event to the application.

* * * * *

UNITED STATES PATENT AND TRADEMARK OFFICE
CERTIFICATE OF CORRECTION

PATENT NO. : 12,153,793 B2  
APPLICATION NO. : 18/181792  
DATED : November 26, 2024  
INVENTOR(S) : Kai Wang Page 1 of 1

It is certified that error appears in the above-identified patent and that said Letters Patent is hereby corrected as shown below:

In the Claims

Column 13, Line 54: Please change "using the device touchpad" to --using the touchpad--

Column 14, Line 13: Please change "trackball." to --trackball,--

Column 14, Lines 29-30: Please change "the second edit region" to --the edit region--

Signed and Sealed this  
First Day of April, 2025

Coke Morgan Stewart  
*Acting Director of the United States Patent and Trademark Office*